US 7,877,596 B2

(12) United States Patent
Foo Kune et al.

(10) Patent No.: US 7,877,596 B2
(45) Date of Patent: Jan. 25, 2011

(54) METHOD AND COMPUTER PRODUCT TO INCREASE ACCURACY OF TIME-BASED SOFTWARE VERIFICATION FOR SENSOR NETWORKS

(75) Inventors: Denis Foo Kune, Saint Paul, MN (US); Karthikeyan Mahadevan, Mountain View, CA (US)

(73) Assignee: Honeywell International Inc., Morristown, NJ (US)

( * ) Notice: Subject to any disclaimer, the term of this patent is extended or adjusted under 35 U.S.C. 154(b) by 1190 days.

(21) Appl. No.: 11/437,173

(22) Filed: May 19, 2006

(65) Prior Publication Data

US 2007/0271452 A1 Nov. 22, 2007

(51) Int. Cl.
*H04L 29/06* (2006.01)

(52) U.S. Cl. .................. 713/153; 380/273; 713/168; 726/15

(58) Field of Classification Search .............. 380/273, 380/272; 713/153, 168; 455/411; 726/15
See application file for complete search history.

(56) References Cited

PUBLICATIONS

Jyh-Cheng and Tao Zhang, "IP-Based Next Generation Wireless Networks, Systems, Architectures and Protocols", John Wiley and Sons, 2004, pp. 327-336.*
3rd Generation Partnership Project 2 (3GPP2): "All-IP Core Network Multimedia Domain, IP Multimedia Call Control Protocol Based on SIP and STP Stage 3", Version 2.0, Jul. 2005, pp. 44-52 and 82.*

* cited by examiner

*Primary Examiner*—Matthew B Smithers
*Assistant Examiner*—Paul Callahan
(74) *Attorney, Agent, or Firm*—Kermit D. Lopez; Luis M. Ortiz; Kris T. Fredrick

(57) ABSTRACT

A recursive verification protocol to reduce the time variance due to delays in the network by putting the subject node at most one hop from the verifier node provides for an efficient manner to test wireless sensor nodes. Since the software signatures are time based, recursive testing will give a much cleaner signal for positive verification of the software running on any one node in the sensor network. In this protocol, the main verifier checks its neighbor, who in turn checks its neighbor, and continuing this process until all nodes have been verified. This ensures minimum time delays for the software verification. Should a node fail the test, the software verification downstream is halted until an alternative path (one not including the failed node) is found. Utilizing techniques well known in the art, having a node tested twice, or not at all, can be avoided.

10 Claims, 4 Drawing Sheets

METHOD AND COMPUTER PRODUCT TO INCREASE ACCURACY OF TIME-BASED SOFTWARE VERIFICATION FOR SENSOR NETWORKS

GOVERNMENT RIGHTS

This invention was made with government support under Contract No. DE-FC36-04GO14002 awarded by the United States Department of Energy. The government has certain rights in this invention.

FIELD OF THE INVENTION

The present invention relates to authenticating software on network nodes, and more specifically, to authentication software on wireless sensor network nodes. This invention was made with Government support under contract DE-FC36-04GO014002 awarded by the Department of Energy. The Government has certain rights in this invention.

BACKGROUND OF THE INVENTION

Wireless remote sensors are used extensively in wireless networks for monitoring purposes. Wireless sensors are becoming more utilized in industrial applications. One major use for wireless sensors is the monitoring of industrial equipment. The sensors provide low cost, low power alternatives to historic monitoring methods, such as physically inspecting equipment. The benefit to having wireless sensors is lost, however, when a sensor begins to behave unexpectedly. The behavior of a sensor is dictated by software installed on the sensor. If a sensor has uncorrupted user-installed software, the behavior of the sensor is predictable, and monitoring results can be assumed to be accurate and precise. However, if an attacker installs a virus or the software otherwise becomes corrupted, the sensor may begin to behave erroneously. Remote verification of the wireless sensors is therefore needed to ensure that all software on the wireless sensors is uncorrupted.

A typical node in a wireless sensor network has very limited resources. Cryptographic signing of the software using public keys as a means of software verification is thus impractical due mainly to the hardware limitations of the wireless sensor nodes. Currently, only time-based software verification protocols have been developed. Time-based verification protocols rely on the time taken to complete a given cryptographic operation on the software resident in the sensor node. Particularly, a verifier node first issues a challenge to a sensor node via the network. In response, the sensor node performs calculations using software installed on the sensor node. The sensor node completes the calculation and transmits the results back to the verifier node. Both the results of the calculation and the time needed to perform the calculation are examined. After the verifier node checks the time, if the result is accurate and the time needed to perform the calculation and report the results falls within an accepted time window, the requester verifies the software installed on the sensor node. However, the time based aspect of this approach can result in inaccurate timestamps if there are a large number of hops, or physical network steps between the verifier and the subject, i.e., a large number of network nodes through which the response must travel from the verifier to the sensor and back. Random delays introduced during transit of a verification packet in a sensor network can mask the time signature of a given software challenge result. Depending on the topography of a network, the number of hops can be arbitrarily large, and random delays can add together to create a scenario where software is deemed to be corrupted because of long time delays, even though the software may be running appropriately.

Therefore, it is an object of the present invention to provide a way of verifying wireless sensor software without introducing the possibility of random time delays due to a large number of hops.

SUMMARY OF THE INVENTION

The present invention provides a recursive verification protocol that reduces the time variance due to delays in the network by placing the subject node at most one hop from the verifier node. Since the software signatures are at least partially time-based, it will give a more accurate verification of the software running on a node in the sensor network. In this protocol, the main verifier checks its neighbor, which in turn, checks its neighbor, and so on. This ensures minimum time delays for the software verification. Should a node fail the test, the software verification downstream is halted until an alternative path (one not including the failed node) is found. Utilizing techniques well known in the art, having a node tested twice, or not at all, can be avoided.

In one embodiment, an entire network is verified. A typical verification of the entire network can proceed as follows. A main verifier sends a cryptographic challenge to each of its immediate neighbors, i.e., nodes that can be accessed by the verifier without the request passing through any intermediate nodes. The verifier reads the response and measures the time to receive the response, which includes a small time delay for transmissions. If the response is accurate and is received within a certain time window, the main verifier sends a command to its immediate neighbors instructing them to send a certain request to their immediate neighbors in turn. Now, each node previously verified by the main verifier acts as a verifier node, allowing them to get precise readings on the time to complete the software verification of their immediate neighbors. The challenges and responses trickle through the network until all the nodes have been tested and verified. As each result is obtained by an acting verifier node, it is forwarded back to the main verifier until the entire network has been verified.

In another embodiment, just a single node can be verified. A typical verification of a single node can proceed as follows. The main verifier identifies the route to a subject node selected for verification. The main verifier then sends a request for software verification to the last node in the route to the subject node. This request instructs the last node in the route before the subject node to generate a cryptographic software verification challenge to the subject node. The acting verifier node does so and reads the response thereto as well as measures the time to complete the challenge. The verifier node then sends the results of the verification back to the requester.

BRIEF DESCRIPTION OF THE DRAWINGS

The foregoing features of this invention, as well as the invention itself, may be more fully understood from the following detailed description of the drawings in which.

DETAILED DESCRIPTION OF THE INVENTION

Figure 1:
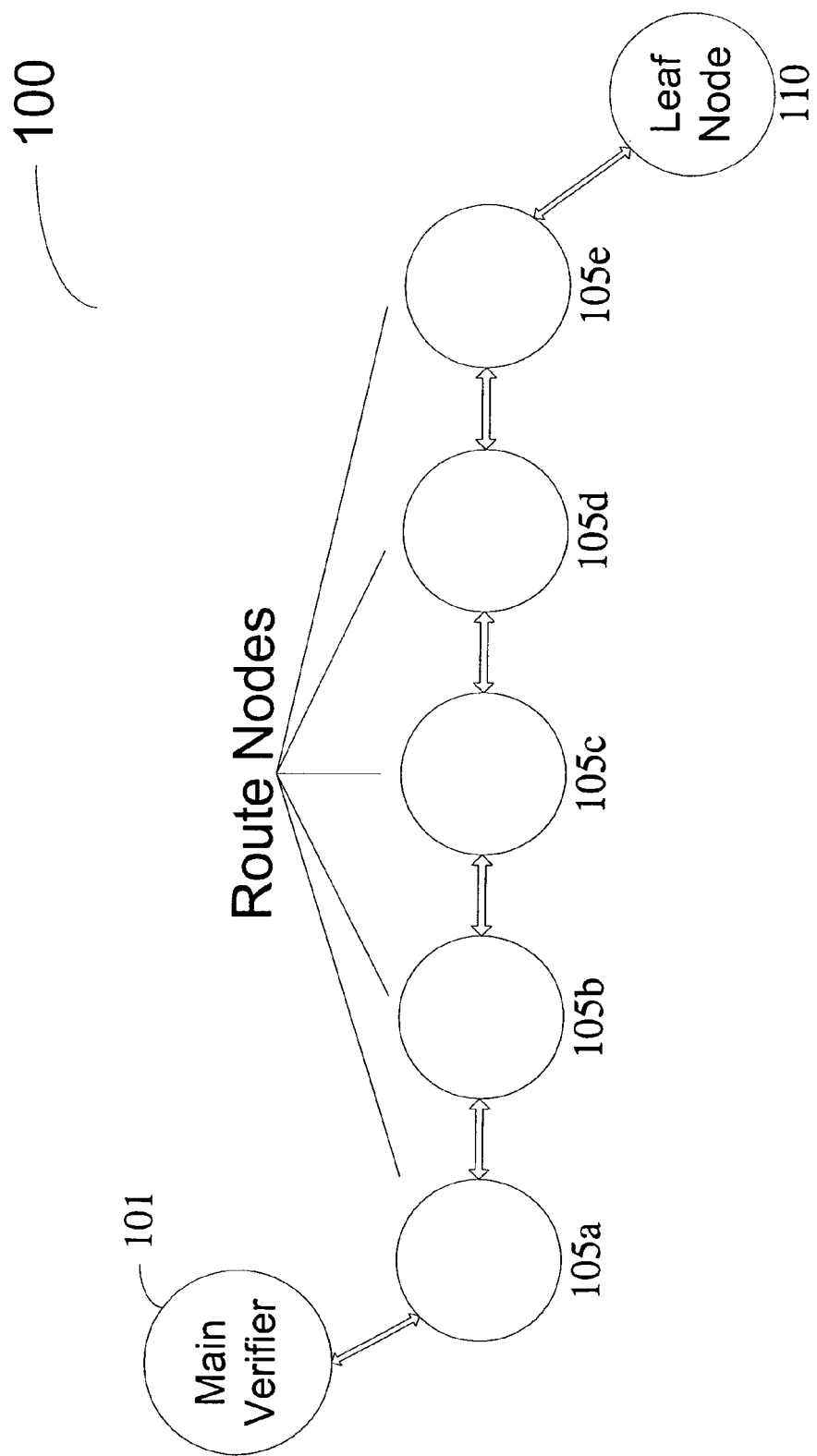
FIG. 1 is a block diagram of a wireless sensor network utilizing existing software verification protocols.

FIG. 1 illustrates an existing wireless sensor network 100 utilizing existing time sensitive testing protocols. Main verifier 101 is prepared to challenge leaf node 110 to determine if the software loaded on leaf node 110 is corrupt. Main verifier 101 issues a challenge to leaf node 110, the challenge comprising a cryptographic operation for the leaf node to perform. However, this challenge must be passed through each route node 105 a-e. Depending on the current functions of the route nodes, the challenge will experience random time delays before it is ultimately received by the leaf node. Once the leaf node completes the challenge, the results are sent back up the route to the main verifier. Each route node again has to pass the result, and random time delays will again accumulate. Once the main verifier receives the result, it checks the result and the time taken. If the time taken to complete the challenge and respond falls within an accepted window of time, and the results of the challenge are correct, the leaf node is determined to be uncorrupted. If the time taken is outside of the accepted window, the leaf node is determined to be corrupted. The main verifier 101 is unaware of the random time delays, and does not take into account any of the accumulated delays experienced as the challenge is being passed through the route nodes 105a-e to leaf node 110. Even if the software loaded on leaf node 110 is uncorrupted, the main verifier may deem the node corrupt due to the accumulated random time delays.

Figure 2:
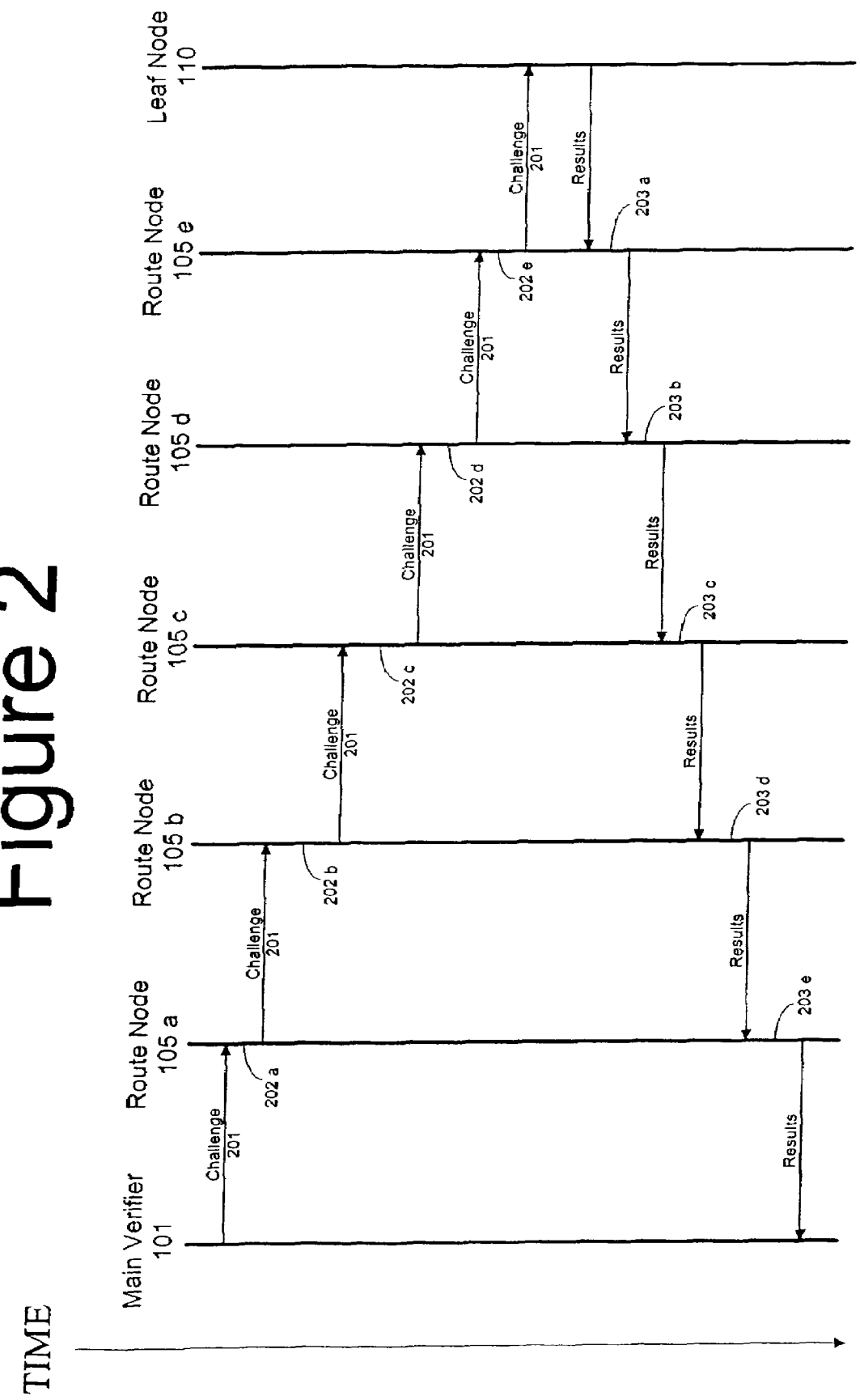
FIG. 2 is a timing diagram of the network in FIG. 1 utilizing existing software verification protocols.

FIG. 2 illustrates a sample timing diagram for the above discussed network. The main verifier 101 sends out the challenge at 201 to begin the diagram. As each route node 105 a-e receives the challenge, there is a random time delay shown in items 202 a-e. A route node may already be performing another task and not have the resources available to immediately pass the challenge on down the route. Once the challenge reaches leaf node 110, there has been an accumulated random time delay. The leaf node processes the challenge and sends the results back up the route to verifier node 101. Again, each route node must pass the results back up the route to the verifier node. Additional random time delays 203 a-e accumulate as the results are sent back up the route. By the time the results reach the verifier node, enough random time delays could have been added to the total time of response to cause the leaf node to appear as corrupt to verifier node 101.

Figure 3:
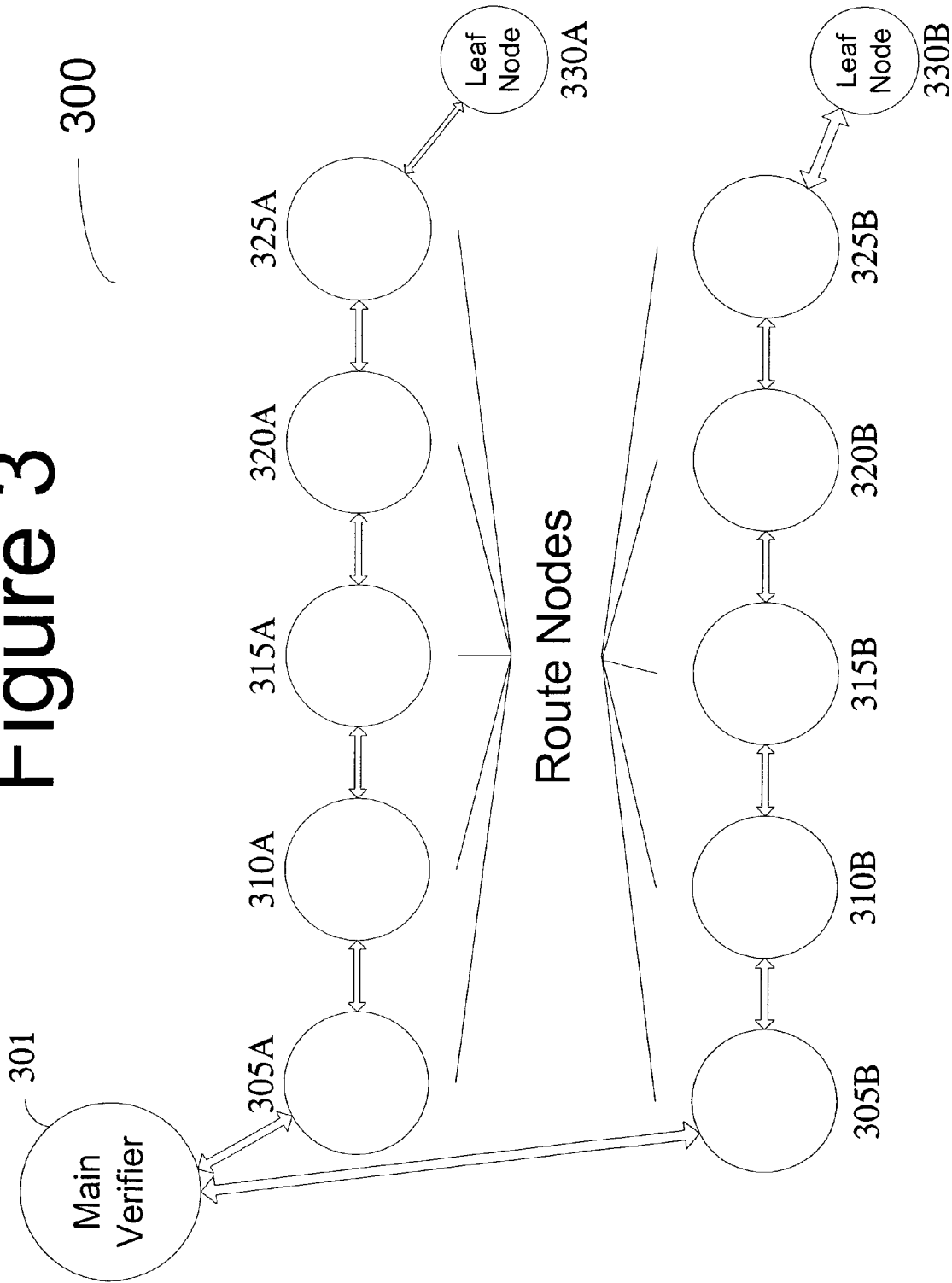
FIG. 3 is a block diagram of a wireless sensor network using an embodiment of the present invention to verify each node in the network.

FIG. 3 illustrates a wireless network 300 utilizing the present invention where a main verifier desires to test every node in the entire network. The main verifier 301 is instructed to check the entire network for verification of uncorrupted software. The main verifier 301 transfers a cryptographic challenge to each of its immediate neighbor nodes, in this case nodes 305a and 305b. Each neighbor node receives the challenge and computes the result to the cryptographic challenge. Once the results of the challenge are calculated, challenged nodes 305a and 305b transfer the results back to the main verifier 301. Main verifier 301 verifies the results of the challenges to determine if the software installed on the node is corrupted. Corrupted software generally will either compute an incorrect result and/or will require additional computational steps to achieve a correct result to the challenge which will result in additional computation time. If the results are correct, and the time delay falls within an accepted time window, the node is deemed to be uncorrupted. If the time falls outside an accepted time window, the node is deemed to be corrupted.

The main verifier next sends out a command to each of its verified immediate neighbor nodes instructing each of them to check their neighbors. Now nodes 305a and 305b become acting verifying nodes. They transfer a cryptographic challenge to each of their neighbor nodes, in this case nodes 310a and 310b. As before, each challenged neighbor node 310a and 310b receives the challenge and computes the result to the cryptographic challenge. Once the results of the challenge are calculated, challenged nodes 310a and 310b transfer the results back to their challenging node, 305a or 305b respectively. Acting verifier nodes 305a and 305b verify the results of the challenges to determine if the software installed on the node is corrupted. Again, if the results are correct and the time delay falls within an accepted time window, the node is deemed to be uncorrupted. After verifying their neighbors, nodes 305A and 305B report back to the main verifier 301. Main verifier 301 maintains a record of all the nodes of the system, and their verification status. If main verifier 301 determines there are additional nodes to be tested, it instructs the most recently challenged nodes, in this case nodes 310A and 310B, to verify all of their unchallenged immediate neighbors.

This process continues down the line until it reaches the last nodes, which in this example are nodes 330A and 330B. Once the main verifier has the results of the challenges to these two nodes, it can report on the status of the entire sensor network. Utilizing techniques well known in the art, the main verifier 301 can assure that each node is only tested once, and that no node goes untested. Should a tested node fail, testing downstream is halted and a new path is found to the nodes further downstream. If the last node of a route fails, then that node is simply removed from the network.

Figure 4:
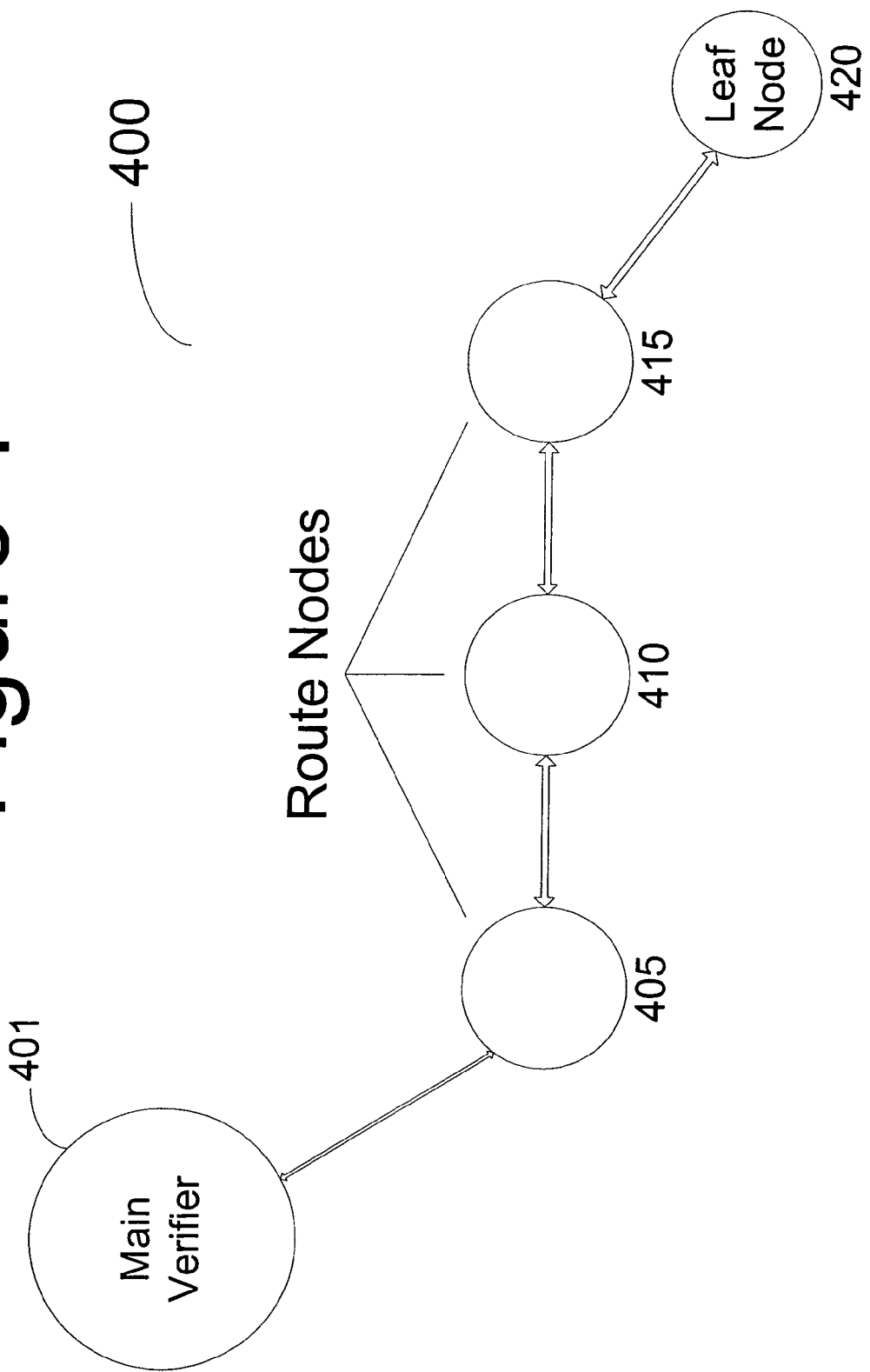
FIG. 4 is a block diagram of a wireless sensor network utilizing an embodiment of the present invention to verify a single node.

FIG. 4 illustrates another embodiment of the invention in which a wireless network 400 utilizes the present invention where a main verifier desires to test only a single node in the network. Main verifier 401 is instructed to verify the status of a single node, in this example leaf node 420. Between the main verifier and the leaf node are route nodes 405, 410 and 415. Main verifier 401 is not instructed to verify these nodes, only leaf node 420, so the scenario used in FIG. 3 would be unnecessarily time and resource consuming.

To verify only leaf node 420, first main verifier 401 sends out a request to challenge with instructions for route node 415 to challenge leaf node 420. Once route node 405 receives this request for challenge and determines the request is not being made to it, it passes the request on to node 410. Similarly to route node 405, route node 410 determines the request to challenge is not intended for it, so it passes the request on to route node 415. Route node 415 verifies that the request is intended for it, and that it is instructed to cryptographically challenge its neighbor node, leaf node 420.

As in the scenario in FIG. 3, route node 415 becomes an acting verifier node. It transfers a cryptographic challenge to each of leaf node 420. Leaf node 420 receives the challenge and computes the result to the cryptographic challenge. Once the results of the challenge are calculated, the challenged leaf node 420 transfers the results back to the verifying route node 415. Route node 415 verifies the results of the challenges to determine if the software installed on the node is corrupted. As discussed above, corrupted software will either compute the wrong result and/or require additional computational steps to achieve a correct result to the challenge which will result in additional computation time. If the results are correct, and fall within an accepted time window, the node is deemed to be uncorrupted. If the result is incorrect and/or the time falls outside an accepted time window, the node is deemed to be corrupted. Route node 415 passes the results of the challenge back through route nodes 410 and 405. Route node 405 passes the results to the main verifier 401 which stores the result. Should the tested node fail, main verifier 401 stores this information and the failed node is removed from the network.

While certain preferred embodiments of the invention have been described, these embodiments have been presented by way of example only, and are not intended to limit the scope of the present invention. For example, in verifying a single node, the node does not have to be a leaf node, but could be any node in the network. Accordingly, the breadth and scope of the present invention should be defined only in accordance with the following claims and their equivalents.

The invention claimed is:

1. A method of verifying software operating nodes of a network using time-based verification, said method comprising the steps of:
   (1) sending from a main verifier node to a plurality of nodes that are one network hop away from said main verifier node a time-based verification challenge;
   (2) each of said first plurality of nodes executing said challenge to generate a result and returning said result to said main verifier node;
   (3) said main verifier node determining time delays between issuing said challenges and receiving said responses for each of said plurality of first nodes;
   (4) said main verifier node determining whether each of said first plurality of nodes is operating properly based on said result and said time delay;
   (5) for each node in said first plurality of nodes that is verified to be operating properly, said main verifier node requesting said node to issue a challenge to a corresponding second plurality of nodes, said second plurality of nodes consisting of said network that are one hop away from said node;
   (6) each verified node of said first plurality of nodes issuing said challenges to said corresponding second plurality of nodes without said challenge passing through another node of said network;
   (7) each of said nodes of said second pluralities of nodes executing said challenge to generate a result and returning said result to said corresponding node of said first plurality of nodes;
   (8) each verified node of said first plurality of nodes determining a time delay between issuing said challenge and receiving said response for each node of said second plurality of nodes corresponding to said node;
   (9) each verified node of said first plurality of nodes sending said responses and recorded time delays to said main verifier node; and
   (10) said main verifier node determining whether said nodes of said second pluralities of nodes are operating properly based on said results and said time delays.

2. The method of claim 1 wherein said challenges each comprise a cryptographic challenge that requires said second node to perform a calculation to render said result.

3. The method of claim 2 wherein step (10) comprises said main verifier determining if said result is an expected result and determining if said time delay is within an expected time window.

4. The method of claim 1 further comprising the steps of:
   (11) for each node in said second pluralities of nodes that is verified to be operating properly, said main verifier node requesting said node to issue a challenge to a corresponding third plurality of nodes, said third plurality of nodes consisting of nodes of said network that are one hop away from said node;
   (12) each verified node of said second pluralities of nodes issuing said challenges to said corresponding third plurality of nodes without said challenge passing through another node of said network;
   (13) each of said nodes of said third pluralities of nodes executing said challenge to generate a result and returning said result to said corresponding node of said second plurality of nodes;
   (14) each verified node of said second plurality of nodes determining a time delay between issuing said challenge and receiving said response for each node of said third plurality of nodes corresponding to said node;
   (15) each verified node of said second pluralities of nodes sending said responses and recorded time delays to said main verifier node; and
   (16) said main verifier node determining whether said nodes of said third plurality of nodes are operating properly based on said results and said time delays.

5. The method of claim 4 wherein if said main verifier determines a node to be operating improperly, the improperly operating node is removed from the network and said main verifier finds an alternate route to nodes one hop from said improperly operating node.

6. A computer program product embodied on a non-transitory computer-readable storage medium for verifying software operating within nodes of a network using time-based verification, said computer product comprising:
   first executable instructions for sending from a main verifier node to a plurality of nodes that are one network hop away from said main verifier node a time-based verification challenge;
   second executable instructions for executing said challenge at each of said first plurality of nodes to generate a result and returning said result to said main verifier node;
   third executable instructions for determining at said main verifier node time delays between issuing said challenges and receiving said responses for each of said plurality of first nodes;
   fourth executable instructions for determining at said main verifier nodes whether each of said first plurality of nodes is operating properly based on said result and said time delay;
   for each node in said first plurality of nodes that is verified to be operating properly, fifth executable instructions for requesting by said main verifier node said node in said first plurality of nodes that is verified to be operating properly issue a challenge to a corresponding second plurality of nodes, said second plurality of nodes consisting of nodes of said network that are one hop away from said node;
   sixth computer executable instructions for issuing said challenges from each verified node of said first plurality of nodes to said corresponding second plurality of nodes without said challenge passing through another node of said network;
   seventh computer executable instructions for executing said challenge at each of said nodes of said second pluralities of nodes to generate a result and returning said result to said corresponding node of said first plurality of nodes;
   eighth computer executable instructions for determining at each verified node of said first plurality of nodes a time delay between issuing said challenge and receiving said response for each node of said second plurality of nodes corresponding to said node;

ninth computer executable instructions for sending said responses and recorded time delays from each verified node of said first plurality of nodes to said main verifier node; and tenth computer executable instructions for determining at said main verifier node whether said nodes of said second pluralities of nodes are operating properly based on said results and said time delays.

7. The computer product embodied on a non-transitory computer-readable storage medium of claim 6 wherein said challenges each comprise a cryptographic challenge that requires said second node to perform a calculation to render said result.

8. The computer product embodied on a non-transitory computer-readable storage medium of claim 7 wherein said tenth executable instructions comprise instructions for determining at said main verifier if said result is an expected result and determining if said time delay is within an expected time window.

9. The computer product embodied on a non-transitory computer-readable storage medium of claim 6 comprising:

for each node in said second pluralities of nodes that is verified to be operating properly, eleventh executable instructions for requesting by said main verifier node said node in said second pluralities of nodes that is verified to be operating properly issue a challenge to a corresponding third plurality of nodes, said third plurality of nodes consisting of nodes of said network that are one hop away from said node;

twelfth executable instructions for issuing by each verified node of said second pluralities of nodes said challenges to said corresponding third plurality of nodes without said challenge passing through another node of said network;

thirteenth executable instructions for executing said challenge at each of said nodes of said third pluralities of nodes to generate a result and returning said result to said corresponding node of said second plurality of nodes;

fourteenth executable instructions for determining at each verified node of said second plurality of nodes a time delay between issuing said challenge and receiving said response for each node of said third plurality of nodes corresponding to said node;

fifteenth executable instructions for sending said responses and recorded time delays from each verified node of said second pluralities of nodes to said main verifier node; and sixteenth executable instructions for determining at said main verifier node whether said nodes of said third plurality of nodes are operating properly based on said results and said time delays.

10. The computer product embodied on a non-transitory computer-readable storage medium of claim 9 wherein if said main verifier determines a node to be operating improperly, the improperly operating node is removed from the network and said main verifier finds and alternate route to nodes one hop from said improperly operating node.

* * * * *